US011338772B2

(12) United States Patent
Bonnet et al.

(10) Patent No.: US 11,338,772 B2
(45) Date of Patent: May 24, 2022

(54) DIGITAL KEYS AND SYSTEMS FOR PREVENTING RELAY ATTACKS

(71) Applicant: Continental Automotive GmbH, Hannover (DE)

(72) Inventors: Jonathan Bonnet, Toulouse (FR); Nicolas Renard, Toulouse (FR)

(73) Assignee: Continental Automotive GmbH, Munich (DE)

( * ) Notice: Subject to any disclaimer, the term of this patent is extended or adjusted under 35 U.S.C. 154(b) by 0 days.

(21) Appl. No.: 17/424,359

(22) PCT Filed: Feb. 19, 2020

(86) PCT No.: PCT/EP2020/054338
§ 371 (c)(1),
(2) Date: Jul. 20, 2021

(87) PCT Pub. No.: WO2020/169656
PCT Pub. Date: Aug. 27, 2020

(65) Prior Publication Data
US 2022/0089121 A1 Mar. 24, 2022

(30) Foreign Application Priority Data
Feb. 19, 2019 (FR) ...................................... 1901651

(51) Int. Cl.
*B60R 25/24* (2013.01)
*G06N 20/00* (2019.01)
(Continued)

(52) U.S. Cl.
CPC .......... *B60R 25/24* (2013.01); *B60R 25/2072* (2013.01); *G06K 9/00536* (2013.01);
(Continued)

(58) Field of Classification Search
CPC ................ B60R 25/24; B60R 25/2072; B60R 2325/205; G06N 20/00; H04W 12/63; H04W 12/68; G06K 9/00536
See application file for complete search history.

(56) References Cited

U.S. PATENT DOCUMENTS 9,455,998 B2 * 9/2016 Ivanchykhin ...... G06Q 20/3278
10,503,970 B1 * 12/2019 Zhang .................. G06V 40/171
(Continued)

OTHER PUBLICATIONS

English Translation of the Written Opinion for International Application No. PCT/EP2020/054338, dated Mar. 30, 2020, 8 pages.
(Continued)

*Primary Examiner* — Thomas D Alunkal
(74) *Attorney, Agent, or Firm* — RatnerPrestia

(57) ABSTRACT

Computer systems for training a machine learning model for preventing relay attacks. Including portable electronic devices capable of controlling the opening or closing, contactlessly, of an access to a road vehicle on the basis of a pretrained machine learning model. The general principle is based on the use of smartphones as a digital key for accessing a road vehicle. Machine learning is used to train a learning model capable of predicting the movement of a smartphone of this type as it approaches or moves away from the road vehicle. Subsequently, access to the road vehicle is authorized only when same receives the information on the movement of the smartphone.

13 Claims, 2 Drawing Sheets

(51) Int. Cl.
  *H04W 12/68*   (2021.01)
  *G06K 9/00*    (2022.01)
  *B60R 25/20*   (2013.01)
  *H04W 12/63*   (2021.01)

(52) U.S. Cl.
  CPC ............ *G06N 20/00* (2019.01); *H04W 12/63* (2021.01); *H04W 12/68* (2021.01); *B60R 2325/205* (2013.01)

(56) References Cited

U.S. PATENT DOCUMENTS

| | | | |
|---|---|---|---|
| 10,897,477 B2* | 1/2021 | Motos | H04W 12/122 |
| 2014/0132391 A1* | 5/2014 | Eder | G07C 9/00309 |
| | | | 340/5.21 |
| 2019/0037034 A1* | 1/2019 | Lee | H04L 67/125 |
| 2019/0039570 A1* | 2/2019 | Foster | G06Q 20/3224 |
| 2019/0044951 A1* | 2/2019 | Zivkovic | H04W 12/08 |
| 2020/0027294 A1* | 1/2020 | Schat | G01S 13/878 |

OTHER PUBLICATIONS

International Search Report and Written Opinion for international Applicatian No. PCT/EP2020/054338, dated Mar. 30, 2020, with partial English translation, 11 pages.

International Search Report and Written Opinion for International Application No. PCT/EP2020/054338, dated Mar. 30, 2020, 14 pages (French).

* cited by examiner

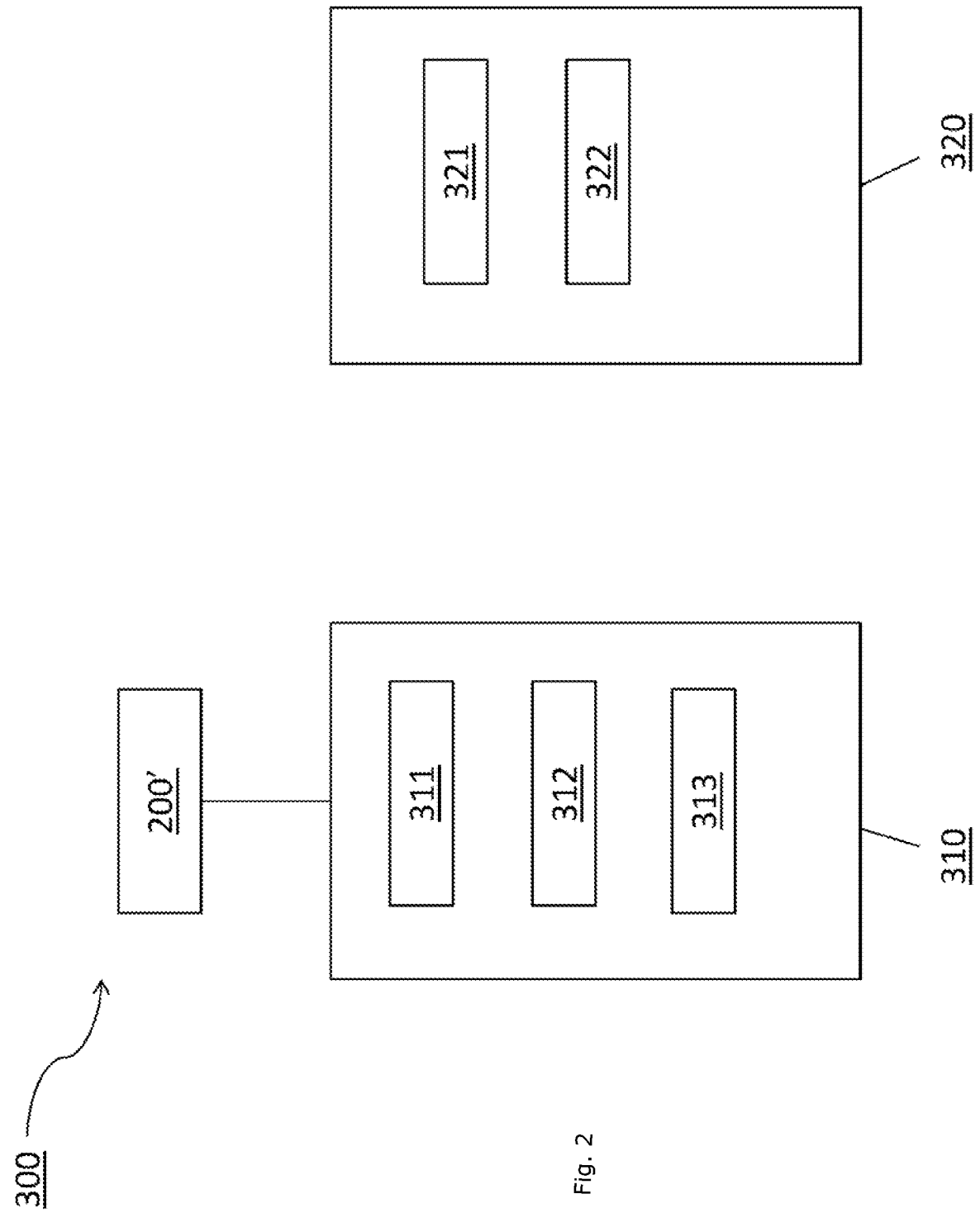

DIGITAL KEYS AND SYSTEMS FOR PREVENTING RELAY ATTACKS

CROSS REFERENCE TO RELATED APPLICATIONS

This application is the U.S. National Phase Application of PCT International Application No. PCT/EP2020/054338, filed Feb. 19, 2020, which claims priority to French Patent Application No. 1901651, filed Feb. 19, 2019, the contents of such applications being incorporated by reference herein.

FIELD OF THE INVENTION

The invention relates to the field of access control by means of portable electronic device. More specifically, it relates to computer systems for training a machine learning model for preventing relay attacks. It also relates to portable electronic devices capable of controlling the opening or closing, contactlessly, of an access to a road vehicle on the basis of a pretrained machine learning model.

BACKGROUND OF THE INVENTION

Many newer vehicles have a keyless entry system that allows the owner of a vehicle to open it contactlessly. In this case, the vehicle detects a radio signal transmitted by an electronic key and opens the vehicle door when the signal is authenticated.

However, these vehicles are sensitive to relay attacks which consist in relaying, via a signal repeater, the signal transmitted by the electronic key, thereby completely bypassing the encryption and the security protocol by making the vehicle believe that the electronic key is nearby. In practice, all that has to be done is place an antenna near the owner of a vehicle (for example at the front door of the owner's home) and retransmit the intercepted signal from the electronic key to an accomplice, who remained with the vehicle, and can now open and start it.

To date, the few solutions that exist against these attacks require the electronic keys to be placed inside a Faraday cage, like a microwave oven or refrigerator. This is not satisfactory.

SUMMARY OF THE INVENTION

An aspect of the present invention therefore aims to overcome the abovementioned drawbacks.

To that end, a first aspect of the invention relates to a computer system for training a machine learning model.

A second aspect of the invention relates to a portable electronic device.

Finally, a third aspect of the invention relates to a road vehicle.

Thus, an aspect of the invention relates to a computer system for training a machine learning model for preventing relay attacks. The system comprises:

a plurality of first portable electronic devices, each intended to be borne by a user and each comprising:

a first wireless transceiver for transmitting a beacon signal, and a first acquisition module for acquiring, during at least one acquisition session, signals relating to the movements of the first portable electronic device, at least a first road vehicle comprising:

a second wireless transceiver for receiving the beacon signal, and a first processor for opening or closing, contactlessly, at least one access to the first road vehicle according to the beacon signal, a machine learning server for training the machine learning model on the basis of the signals from the acquisition modules, the machine learning server being provided to:

obtain the signals generated by each first acquisition module, in response to the associated first portable electronic device being moved by the user, when the first processor opens or closes the access to the first road vehicle, calculate, for each acquisition session, a direction vector of the first portable electronic device, on the basis of the acquired signals, associate, for each acquisition session, the direction vector with a first predefined item of information which is either indicative of the movement of the first portable electronic device in the direction of the first road vehicle, or indicative of the movement of the first portable electronic device in the opposite direction to the first road vehicle, create, for each acquisition session, a characteristic vector on the basis of the acquired signals and the first predefined item of information, and apply a supervised classification algorithm to the machine learning model according to all or some of the characteristic vectors.

According to a first embodiment, the movement comprises a gesture of engagement with the first portable electronic device performed by the user, the machine learning server being further provided to add, to each characteristic vector, a second predefined item of information which is indicative of a type of gesture of engagement performed by the user.

According to a second embodiment, the machine learning server is further provided to add, to each characteristic vector, a third predefined item of information which is indicative of a predefined location, on the user, of the associated first portable electronic device.

According to a third embodiment, the machine learning server is further provided to:

extract, for each acquisition session, frequency information from the acquired signals, and add the frequency information to each associated characteristic vector.

According to a fourth embodiment, each acquisition session is associated with at least one time window extending over a predetermined duration, the machine learning server being further provided to add, to each characteristic vector, the predetermined duration.

An aspect of the invention also covers a portable electronic device intended to be borne by a user. The device comprises:

a third wireless transceiver for transmitting a beacon signal able to open or close, contactlessly, at least one access to a second road vehicle, a second acquisition module for acquiring, during at least one acquisition session, in response to the first portable electronic device being moved by the user, signals relating to the movements of the portable electronic device, a second processor for:

applying, to the input of a machine learning model pretrained according to the first aspect of the invention, the signals from the second acquisition module, so as to obtain, at the output of the pretrained machine learning model, a first predefined item of information, a second predefined item of information and/or a third predefined item of information, the first predefined item of information being either indicative of the movement of the portable electronic device in the direction of the second road vehicle, or indicative of the movement of the portable electronic device in the opposite direction to the second road vehicle, the second predefined item of information being indicative of a type of engagement gesture with the portable electronic device performed by the user, the third predefined item of information being indicative of a predefined location, on the user, of the portable electronic device, and adding the first predefined item of information, the second predefined item of information and/or the third predefined item of information to the beacon signal.

According to a first embodiment, the second processor is further provided to:

extract frequency information from the acquired signals, and apply the frequency information to the input of the pretrained machine learning model.

According to a second embodiment, the acquisition session is associated with at least one time window extending over a predetermined duration, the second processor being further provided to apply, to the input of the pretrained machine learning model, the predetermined duration.

In one variant of the first and second aspects of the invention, the first acquisition module comprises at least one sensor from a group comprising: an accelerometer, a linear accelerometer, a gyroscope, a gravity sensor, an orientation sensor, a pedometer or any combination thereof.

Finally, an aspect of the invention also covers a road vehicle comprising:

a fourth wireless transceiver for receiving a beacon signal transmitted by a portable electronic device as defined according to the second aspect of the invention, and a third processor for processing the beacon signal and opening or closing, contactlessly, at least one access to the road vehicle when the beacon signal comprises a first predefined item of information, a second predefined item of information and/or a third predefined item of information, the first predefined item of information being either indicative of the movement of the portable electronic device in the direction of the road vehicle, or indicative of the movement of the portable electronic device in the opposite direction to the road vehicle, the second predefined item of information being indicative of a type of engagement gesture with the portable electronic device performed by the user, the third predefined item of information being indicative of a predefined location, on the user, of the portable electronic device.

BRIEF DESCRIPTION OF THE DRAWINGS

Other features and advantages of the invention will be better understood from reading the following description with reference to the appended drawings, which are provided by way of non-limiting illustration.

FIG. 2 shows a second computer system according to an aspect of the invention.

Figure 1:
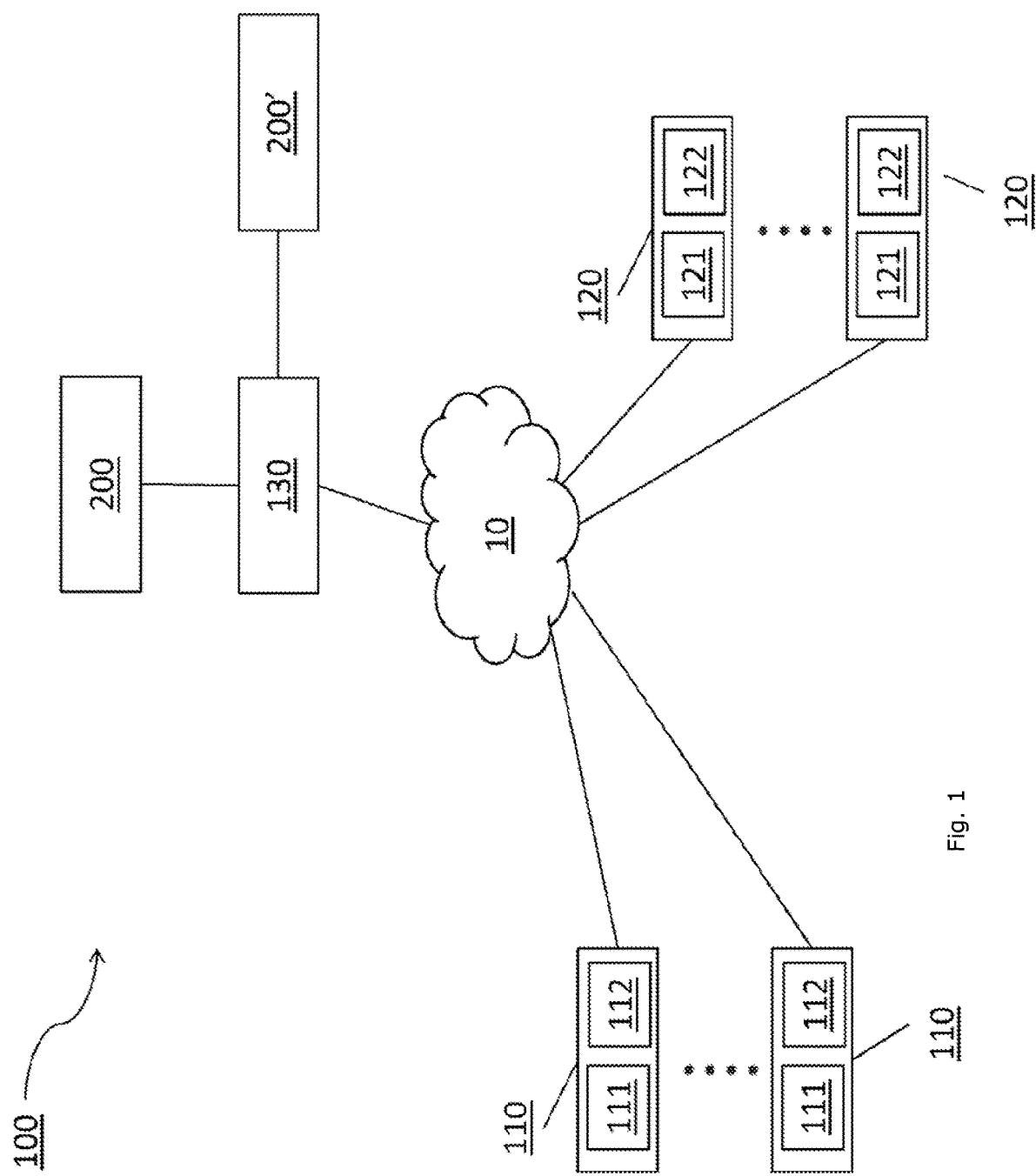
FIG. 1 shows a first computer system according to an aspect of the invention.

For the sake of clarity, the elements shown are not necessarily to scale with respect to one another, unless specified otherwise.

DETAILED DESCRIPTION OF THE PREFERRED EMBODIMENTS

The general principle of an aspect of the invention is based on the use of smartphones as a digital key for accessing a road vehicle. An aspect of the invention uses machine learning to train a learning model capable of predicting the movement of a smartphone of this type as it approaches or moves away from the road vehicle. Subsequently, access to the road vehicle is authorized only when same receives the information on the movement of the smartphone.

FIG. 1 illustrates a computer system 100 according to an aspect of the invention for training a machine learning model 200. In one particular implementation, the machine learning model 200 consists of an artificial neural network of multilayer perceptron type.

The computer system 100 comprises a plurality of first portable electronic devices 110, at least a first road vehicle 120, and at least a first machine learning server 130. The computer system 100 is furthermore designed with a cloud computing architecture (cloud computing system) that is based on a wireless communication network 10.

In the example of FIG. 1, each of the first portable electronic devices 110 is intended to be borne by a user. For example, the portable electronic device 110 may be carried in one of the user's hands, in one of the user's trouser pockets, or in a user's bag or satchel. What matters is that the user may easily access the portable electronic device 110. What is meant by portable electronic device is any device similar to a smartphone, a tablet computer, a smart watch or smart bracelet, or a personal digital assistant.

Furthermore, each portable electronic device 110 comprises a first wireless transceiver 111 and a first acquisition module 112 which are operatively coupled to one another.

The first wireless transceiver 111 is provided to transmit, at a predetermined interval, a beacon signal. In one example, the beacon signal is a short-range radio signal using a known communication protocol of RFID, Wi-Fi or Bluetooth type. However, other short-range signals using other communication protocols may also be used without requiring major modifications to an aspect of the invention.

The first acquisition module 112 is intended to acquire signals relating to the movements of the first portable electronic device 110.

In one example, the first acquisition module 112 comprises at least one sensor from a group comprising: an accelerometer, a linear accelerometer (user acceleration), a gyroscope, a gravity sensor, an orientation sensor (attitude and heading reference system), a pedometer, or any combination thereof.

In the example of FIG. 1, each of the first road vehicles 120 comprises a second wireless transceiver 121 and a first processor 122 which are operatively coupled to one another. A road vehicle is understood to mean any vehicle equipped with an engine or motor (generally a combustion engine or electric motor) intended to move on a road network and capable of transporting people or loads (for example, a car or a motorcycle).

The second wireless transceiver 121 is intended to receive the beacon signal. In practice, the beacon signal allows a portable electronic device 110 to synchronize with a road vehicle 120.

The first processor 122 is intended to open or close, contactlessly, at least one access to the first road vehicle 120 according to the received beacon signal.

In one particular implementation, the first processor 122 opens or closes an access to the first road vehicle 120 according to a received power level of the beacon signal. For example, the first processor 122 opens an access to the first road vehicle 120 when the received power level of the beacon signal is beyond a first predetermined threshold. In another example, if an access to the first road vehicle 120 is already open, the first processor 122 closes the access to the first road vehicle 120 when the received power level of the beacon signal is below a second predetermined threshold.

In the example of FIG. 1, the machine learning server 130 is intended to train the machine learning model 200 on the basis of signals received from the acquisition modules 112

In the example of FIG. 1, the machine learning server 130 is first intended to obtain the signals generated by each first acquisition module 112, in response to the associated first portable electronic device 110 being moved by the user, when the first processor 122 opens or closes the access to the first road vehicle 120.

In a first example, reference is made to a user bearing a first portable electronic device 110 and a first road vehicle 120, one of the accesses of which is in closed mode. In this example, the user approaches the first road vehicle 120 so as to allow the access to the first road vehicle 120 to transition from closed mode to open mode. By approaching the first road vehicle 120, the user causes the first portable electronic device 110 to move. Specifically, as described above in one example, the user may carry the first portable electronic device 110 by hand, in one of their trouser pockets, or in their bag or a satchel. During the movement of the first portable electronic device 110, the machine learning server 130 retrieves the signals acquired by the first acquisition module 112 of the first portable electronic device 110.

In a second example, reference is made to a user bearing a first portable electronic device 110 and a first road vehicle 120, one of the accesses of which is in open mode. In this case, the user may be in the first road vehicle 120 or close to the first road vehicle 120. In this example, the user moves away from the first road vehicle 120 so as to allow the access to the first road vehicle 120 to transition from open mode to closed mode. By moving away from the first road vehicle 120, the user causes the first portable electronic device 110 to move. Specifically, as described above, the user may carry the first portable electronic device 110 in one of their trouser pockets, or in their bag or a satchel. During the movement of the first portable electronic device 110, the machine learning server 130 retrieves the signals acquired by the first acquisition module 112 of the first portable electronic device 110.

In one particular implementation of the first and second examples, the first acquisition module 112 performs the acquisitions during at least one acquisition session. In one example, the acquisition session is associated with at least one time window extending over a predetermined duration. Preferably, the predetermined duration is chosen from the interval between 0.5 s and 5 s. In one example of the invention, as described below, the machine learning server 130 is further intended to use the predetermined duration in training the machine learning model 200.

Preferably, the machine learning server 130 will keep only the signals associated with at least one time window that is centered around the moment when access to the first road vehicle 120 transitions from closed mode to open mode or when access to the first road vehicle 120 transitions from open mode to closed mode.

In addition, when the various signals acquired by the first acquisition module 112 are not acquired at the same frequency, the machine learning server 130 is also intended to perform interpolation operations so that all or some of said signals have a common acquisition frequency.

Next, the machine learning server 130 is intended to calculate, for each acquisition session, a direction vector of the first portable electronic device 110, on the basis of the acquired signals. In one example, the direction vector is obtained on the basis of the signals acquired by an accelerometer.

Next, the machine learning server 130 is intended to associate, for each acquisition session, the direction vector with a first predefined item of information which is either indicative of the movement of the first portable electronic device in the direction of the first road vehicle, or indicative of the movement of the first portable electronic device in the opposite direction to the first road vehicle.

Subsequently, the machine learning server 130 is intended to create, for each acquisition session, a characteristic vector on the basis of the acquired signals and the first predefined item of information.

Finally, the machine learning server 130 is intended to apply a supervised classification algorithm to the machine learning model 200 according to all or some of the characteristic vectors, so as to obtain a pretrained machine learning model 200' as described below in relation to FIG. 2.

In a first particular implementation, the movement comprises a gesture of engagement with the first portable electronic device 110 performed by the user, the machine learning server 130 being further provided to add, to each characteristic vector, a second predefined item of information which is indicative of a type of gesture of engagement performed by the user.

Returning to the first example mentioned above, referring to a user bearing a first portable electronic device 110 and a first road vehicle 120, one of the accesses of which is in closed mode. In the continuation of this example, the user carries the first portable electronic device 110 in their hand and approaches the first road vehicle 120 so as to allow the access to the first road vehicle 120 to transition from closed mode to open mode. However, while approaching the first road vehicle 120, the user causes the first portable electronic device 110 to move by performing a gesture of engagement with the first portable electronic device 110. For example, the gesture of engagement with the first portable electronic device 110 consists in producing a geometric shape in the air, such as a circle or a square. Of course, the gesture of engagement may be more complex, depending on the usage needs of an aspect of the invention. During the movement of the first portable electronic device 110, the machine learning server 130 retrieves the signals acquired by the first acquisition module 112 of the first portable electronic device 110.

In a second particular implementation, the machine learning server 130 is further provided to add, to each characteristic vector, a third predefined item of information which is indicative of a predefined location, on the user, of the associated first portable electronic device 110. Reference will be made to the example mentioned above in which it is indicated that the first portable electronic device 110 may be carried by hand, in one of the user's trouser pockets, in their bag or a satchel. However, other configurations may be envisaged depending on the usage needs of an aspect of the invention. For example, the following predefined positions may be identified: front pocket, back pocket, front pocket with one of the faces of the first portable electronic device 110 facing the body, rear pocket with one of the faces of the first portable electronic device 110 facing away from the first road vehicle 120, and so on.

In a third particular implementation, the machine learning server 130 is further provided to:

extract, for each acquisition session, frequency information from the acquired signals, and add the frequency information to each associated characteristic vector.

In one example, the frequency information comprises the amplitude and the variation in amplitude of the acquired signals. However, other frequency information may also be extracted without requiring major modifications to an aspect of the invention. For this, signal processing techniques such as Fourier transforms or sliding Fourier transforms may be used.

FIG. 2 illustrates a computer system 300 according to an aspect of the invention for using the machine learning model 200' pretrained according to the computer system 100. The computer system 200 comprises a portable electronic device 310 and a second road vehicle 320.

In the example of FIG. 2, the portable electronic device 310 comprises a third wireless transceiver 311 and a second acquisition module 312 which are similar to the first wireless transceiver 111 and to the first acquisition module 112, respectively, of the first portable electronic devices 110, as described above.

In practice, the third wireless transceiver 311 is intended to transmit a beacon signal able to open or close, contactlessly, at least one access to the second road vehicle 320. Furthermore, the second acquisition module 312 is intended to acquire, during at least one acquisition session, in response to the first portable electronic device being moved by the user, signals relating to the movements of the portable electronic device.

In addition, the portable electronic device 310 comprises a second processor 313 for applying, to the input of the pretrained machine learning model 200', the signals from the second acquisition module 312, so as to obtain, at the output of the pretrained machine learning model 200', a first predefined item of information, a second predefined item of information and/or a third predefined item of information.

In an aspect of the invention, as described above, the first predefined item of information is either indicative of the movement of the portable electronic device 310 in the direction of the second road vehicle, or indicative of the movement of the portable electronic device 310 in the opposite direction to the second road vehicle.

Next, the second predefined item of information is indicative of a type of gesture of engagement with the portable electronic device 310 performed by the user, as described above.

Then, the third predefined item of information is indicative of a predefined location, on the user, of the portable electronic device 310.

Finally, the second processor 313 is intended to add the first predefined item of information, the second predefined item of information and/or the third predefined item of information to the beacon signal.

In one particular implementation, as described above, the second processor 313 is further provided to:

extract frequency information from the acquired signals, and apply the frequency information to the input of the pretrained machine learning model 200'.

In one example of the invention, as described above, the acquisition session is associated with at least one time window extending over a predetermined duration and the second processor 313 is further provided to apply, to the input of the pretrained machine learning model 200', the predetermined duration.

In the example of FIG. 2, the second road vehicle 320 comprises a fourth wireless transceiver 321 and a third processor 322 which are similar to the second wireless transceiver 121 and to the first processor 122, respectively, of the first road vehicles 120, as described above.

In practice, the fourth wireless transceiver 321 is intended to receive a beacon signal transmitted by the portable electronic device 310.

In addition, the third processor 322 is intended to process the beacon signal and open or close, contactlessly, at least one access to the road vehicle when the beacon signal comprises the first predefined item of information, the second predefined item of information and/or the third predefined item of information, as described above.

In one particular embodiment of the invention, the various operations performed by the first, second and third processors 122, 313, 322 are determined by computer program instructions. Therefore, an aspect of the invention also pertains to a program containing a computer program code stored on a non-transient storage medium, this program code being capable of executing the various operations performed by the first, second and third processors 122, 313, 322 when the computer program is loaded into the computer or run on the computer.

An aspect of the present invention has been described and illustrated in the present detailed description and in the figures. However, an aspect of the present invention is not limited to the presented embodiments. Thus, after reading the present description and studying the appended drawings, those skilled in the art will be able to deduce and implement other embodiments and variants.

In one example, the portable electronic devices may comprise an audio sensor for recording a voice signal produced by the user during the movement of the portable electronic devices. In this case, the voice signals may be included in the characteristic vectors for training the machine learning model. Then, when using the pretrained machine learning model, the user will be able to open or close the access to the road vehicle by producing the recorded voice signal.

In another example, the road vehicle may be replaced with any entity allowing contactless access or exit control, such as a door, a gate, or a turnstile. In this case, all that is required is to integrate the technical features of the road vehicle, described above, into the entity in question.

The invention claimed is:

1. A computer system for training a machine learning model for preventing relay attacks, the system comprising:
 a plurality of first portable electronic devices, each intended to be borne by a user and each comprising:
  a first wireless transceiver for transmitting a beacon signal, and
  a first acquisition module for acquiring, during at least one acquisition session, signals relating to the movements of the first portable electronic device;
 at least a first road vehicle comprising:
  a second wireless transceiver for receiving the beacon signal, and
  a first processor for opening or closing, contactlessly, at least one access to the first road vehicle according to the beacon signal; and
 a machine learning server for training the machine learning model on the basis of the signals from the acquisition modules, the machine learning server being provided to:
  obtain the signals generated by each first acquisition module, in response to the associated first portable electronic device being moved by the user, when the first processor opens or closes the access to the first road vehicle, calculate, for each acquisition session, a direction vector of the first portable electronic device, on the basis of the acquired signals, associate, for each acquisition session, the direction vector with a first predefined item of information which is either indicative of the movement of the first portable electronic device in the direction of the first road vehicle, or indicative of the movement of the first portable electronic device in the opposite direction to the first road vehicle, create, for each acquisition session, a characteristic vector on the basis of the acquired signals and the first predefined item of information, and apply a supervised classification algorithm to the machine learning model according to all or some of the characteristic vectors.

2. The computer system as claimed in claim 1, wherein the movement comprises a gesture of engagement with the first portable electronic device performed by the user, the machine learning server being further provided to add, to each characteristic vector, a second predefined item of information which is indicative of a type of gesture of engagement performed by the user.

3. The computer system as claimed in claim 1, wherein the machine learning server is further provided to add, to each characteristic vector, a third predefined item of information which is indicative of a predefined location, on the user, of the associated first portable electronic device.

4. The computer system as claimed in claim 1, wherein the machine learning server is further provided to:

extract, for each acquisition session, frequency information from the acquired signals, and add the frequency information to each associated characteristic vector.

5. The computer system as claimed in claim 1, wherein each acquisition session is associated with at least one time window extending over a predetermined duration, the machine learning server being further provided to add, to each characteristic vector, the predetermined duration.

6. A portable electronic device intended to be borne by a user and comprising:

a third wireless transceiver for transmitting a beacon signal able to open or close, contactlessly, at least one access to a second road vehicle;

a second acquisition module for acquiring, during at least one acquisition session, in response to the first portable electronic device being moved by the user, signals relating to the movements of the portable electronic; and a second processor for:

applying, to the input of a machine learning model pretrained by a computer system according to claim 1, the signals from the second acquisition module, so as to obtain, at the output of the pretrained machine learning model, a first predefined item of information, the first predefined item of information being either indicative of the movement of the portable electronic device in the direction of the second road vehicle, or indicative of the movement of the portable electronic device in the opposite direction to the second road vehicle, and adding the first predefined item of information to the beacon signal.

7. The portable electronic device as claimed in claim 6, wherein the second processor is further provided to:

extract frequency information from the acquired signals, and apply the frequency information to the input of the pretrained machine learning model.

8. The portable electronic device as claimed in claim 6, wherein the acquisition session is associated with at least one time window extending over a predetermined duration, the second processor being further provided to apply, to the input of the pretrained machine learning model, the predetermined duration.

9. The computer system as claimed in claim 1, wherein the first acquisition module comprises at least one sensor from a group comprising: an accelerometer, a linear accelerometer, a gyroscope, a gravity sensor, an orientation sensor, a pedometer or any combination thereof.

10. A road vehicle comprising:

a fourth wireless transceiver for receiving a beacon signal transmitted by a portable electronic device as defined in claim 6, and a third processor for processing the beacon signal and opening or closing, contactlessly, at least one access to the road vehicle when the beacon signal comprises a first predefined item of information, a second predefined item of information and/or a third predefined item of information, the first predefined item of information being either indicative of the movement of the portable electronic device in the direction of the road vehicle, or indicative of the movement of the portable electronic device in the opposite direction to the road vehicle, the second predefined item of information being indicative of a type of engagement gesture with the portable electronic device performed by the user, the third predefined item of information being indicative of a predefined location, on the user, of the portable electronic device.

11. The portable electronic device as claimed in claim 6, wherein the first acquisition module comprises at least one sensor from a group comprising: an accelerometer, a linear accelerometer, a gyroscope, a gravity sensor, an orientation sensor, a pedometer or any combination thereof.

12. The computer system as claimed in claim 2, wherein the machine learning server is further provided to add, to each characteristic vector, a third predefined item of information which is indicative of a predefined location, on the user, of the associated first portable electronic device.

13. The portable electronic device as claimed in claim 7, wherein the acquisition session is associated with at least one time window extending over a predetermined duration, the second processor being further provided to apply, to the input of the pretrained machine learning model, the predetermined duration.

* * * * *